United States Patent
Afkhami et al.

(10) Patent No.: US 9,537,673 B2
(45) Date of Patent: Jan. 3, 2017

(54) MINIMIZING INTERFERENCE BETWEEN COMMUNICATION NETWORKS

(71) Applicant: QUALCOMM Incorporated, San Diego, CA (US)

(72) Inventors: Hassan Kaywan Afkhami, San Jose, CA (US); Purva Rameshchandra Rajkotia, Orlando, FL (US); Deniz Rende, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/077,658

(22) Filed: Mar. 22, 2016

(65) Prior Publication Data

US 2016/0204830 A1 Jul. 14, 2016

Related U.S. Application Data

(63) Continuation of application No. 14/305,964, filed on Jun. 16, 2014, now Pat. No. 9,325,522.

(51) Int. Cl.
*H04L 12/46* (2006.01)
*H04B 3/54* (2006.01)
(Continued)

(52) U.S. Cl.
CPC .............. *H04L 12/4625* (2013.01); *H04B 3/32* (2013.01); *H04B 3/46* (2013.01); *H04B 3/487* (2015.01);
(Continued)

(58) Field of Classification Search
CPC ................. H04B 2001/71077; H04B 1/71072; H04B 1/16–1/7102; H04B 1/1027–1/126; H04B 1/7097–1/712; H04B 2201/7097–2201/70979; H04B 2001/7154; H04L 25/08
See application file for complete search history.

(56) References Cited

U.S. PATENT DOCUMENTS 9,019,905 B2 * 4/2015 Kazmi ................ H04W 52/146
                                                                    370/252
9,325,522 B2 4/2016 Afkhami et al.
(Continued)

FOREIGN PATENT DOCUMENTS

EP          1530313       5/2005
WO      2013089757       6/2013

OTHER PUBLICATIONS

"G.hn, G.vdsl, G.fast Powerline Interference Indication and Mitigation for DSL transceivers", Metanoia Technologies Inc., AT&T Inc., Sep. 4, 2013, 16 pages.
(Continued)

*Primary Examiner* — Dac Ha
(74) *Attorney, Agent, or Firm* — DeLizio Law, PLLC

(57) ABSTRACT

Methods, systems, and devices are described for minimizing mutual interference between networks that implement different protocols. In one embodiment, a first network device of a first network may exchange coexistence information with a second network device of a second network to determine whether to share resources or reduce transmit power based, at least in part, on the interference detected at the first network device from a transmission of the second network device. In one embodiment, both the first and the second network devices may independently and iteratively reduce their respective transmit power to minimize interference between the interfering networks. The first network device may reduce its transmit power based on an interference of the second network device and vice versa. In another embodiment, the network device with a lower priority may (Continued)

minimize its transmit power to reduce interference with the network device with a higher priority.

26 Claims, 7 Drawing Sheets

(51) Int. Cl.

| | | |
|---|---|---|
| H04L 1/00 | (2006.01) | |
| H04B 3/46 | (2015.01) | |
| H04M 3/22 | (2006.01) | |
| H04B 3/32 | (2006.01) | |
| H04B 3/487 | (2015.01) | |

(52) U.S. Cl.
CPC ............... *H04B 3/54* (2013.01); *H04B 3/542* (2013.01); *H04L 1/0021* (2013.01); *H04L 1/0026* (2013.01); *H04M 3/2254* (2013.01); *H04B 2203/5425* (2013.01)

(56) References Cited

U.S. PATENT DOCUMENTS

| | | |
|---|---|---|
| 2007/0060057 A1 | 3/2007 | Matsuo et al. |
| 2008/0225687 A1 | 9/2008 | Oksman |
| 2009/0017762 A1 | 1/2009 | Jovicic et al. |
| 2012/0106606 A1 | 5/2012 | Samy |
| 2013/0090141 A1* | 4/2013 | Hottinen ................ H04B 15/00 455/501 |
| 2013/0217402 A1* | 8/2013 | Lin ........................ H04W 72/12 455/450 |
| 2013/0279552 A1 | 10/2013 | Gomez Martinez et al. |
| 2014/0355621 A1 | 12/2014 | Katar et al. |
| 2015/0063098 A1 | 3/2015 | Yavuz et al. |
| 2015/0098440 A1* | 4/2015 | Yang .................... H04J 11/0056 370/330 |
| 2015/0365256 A1 | 12/2015 | Afkhami |
| 2016/0112177 A1* | 4/2016 | Zheng .................... H04L 5/0051 370/330 |

OTHER PUBLICATIONS

"PCT Application No. PCT/US2015/034865 International Search Report", Aug. 31, 2015, 14 pages.
"PCT Application No. PCT/US2015/034865 Written Opinion", Jun. 22, 2016, 4 pages.
"U.S. Appl. No. 14/305,964 Final Office Action", Sep. 18, 2015, 12 pages.
"U.S. Appl. No. 14/305,964 Office Action", Apr. 20, 2015, 12 pages.
Bshara, et al., "Potential Effects of Power Line Communication on xDSL Inside the Home Environment", VIII Semetro, Joo Pessoa. Jun. 17-Jun. 19, 2009, Jun. 2009, 5 pages.

* cited by examiner

MINIMIZING INTERFERENCE BETWEEN COMMUNICATION NETWORKS

RELATED APPLICATIONS

This application is a Continuation of and claims the priority benefit of U.S. application Ser. No. 14/305,964 filed on Jun. 16, 2014.

BACKGROUND

Embodiments of this disclosure generally relate to the field of communication networks and, more particularly, to minimizing interference between communication networks.

A powerline communication (PLC) network and a digital subscriber line (DSL) network typically operate on an overlapping set of operating frequencies within the 2-88 MHz frequency band. PLC devices in the PLC network exchange communications via power lines. DSL devices in the DSL network exchange communications via telephone lines. Although the PLC devices and the DSL devices use different communication media for transmission, the PLC transmissions may electromagnetically couple with the DSL transmissions and vice versa. This may cause interference in the PLC network and the DSL network.

SUMMARY

Various embodiments for minimizing interference between communication networks are disclosed. In one embodiment, a first network device of a first communication network determines an interference level associated with a second network device of a second communication network; determines, in response to determining that the interference level does not exceed an interference threshold, to reduce at least one member selected from the group consisting of: a first transmit power of the first network device, and a second transmit power of the second network device; and determines to share a communication resource between the first network device and the second network device in response to determining that the interference level exceeds the interference threshold.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
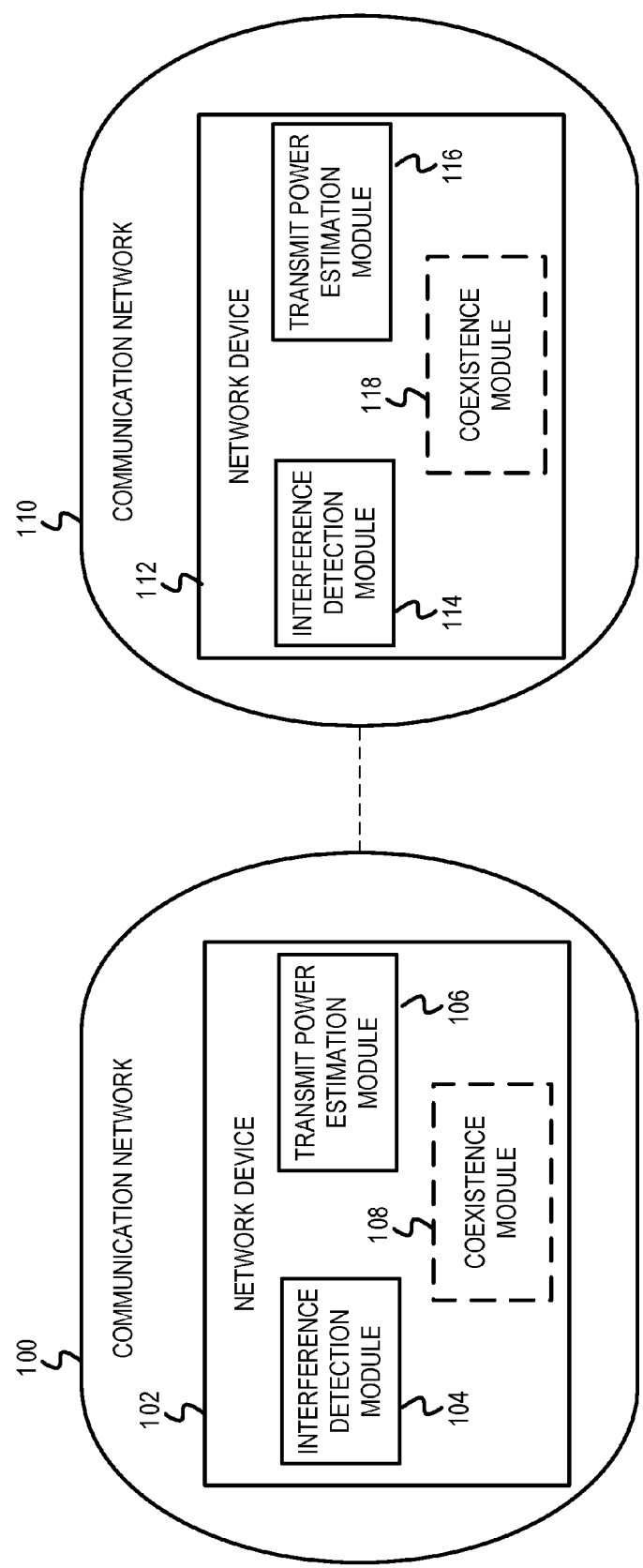
FIG. 1 is a block diagram illustrating an example mechanism for minimizing interference between communication networks.

The description that follows includes exemplary systems, methods, techniques, instruction sequences, and computer program products that embody techniques of this disclosure. However, it is understood that the described embodiments may be practiced without these specific details. For instance, although examples refer to minimizing interference between a powerline communication (PLC) network and a very-high-bit-rate digital subscriber line (VDSL) network, embodiments are not so limited. In other embodiments, the techniques described herein may be implemented to minimize interference between other suitable communication networks that share at least a portion of their respective operating frequency band. In other instances, well-known instruction instances, protocols, structures, and techniques have not been shown in detail in order not to obfuscate the description.

A PLC network and a VDSL network typically operate on an overlapping set of operating frequencies of different communication media. However, if the PLC network and the VDSL network are in close proximity to each other, PLC transmissions may become electromagnetically coupled with VDSL transmissions, and vice versa. Consequently, the PLC network may experience interference from transmissions of the VDSL network and vice versa. Increasing a maximum transmit power (e.g., determined by power regulatory groups) associated with the PLC network can enhance the performance of the PLC network. However, increasing the maximum transmit power of the PLC network may increase the interference in the VDSL network and may further degrade the performance of the VDSL network.

A PLC device and/or a VDSL device may implement functionality to estimate and minimize interference between the devices. In some embodiments, the PLC device and the VDSL device may exchange coexistence messages via an alternate communication network (e.g., Ethernet) to determine how to minimize mutual interference. For example, the PLC device and the VDSL device may exchange coexistence messages to determine whether to share communication resources (e.g., time on the wire, frequency spectrum, etc.) or reduce the transmit power depending on the interference between the PLC network and the VDSL network. This technique may be referred to as "coordinated interference reduction technique" and will be further described in FIGS. 1-4. In another embodiment, both the PLC device and the VDSL device may iteratively reduce their respective transmit power to minimize interference between the PLC and the VDSL devices. In this embodiment, the PLC device may estimate a transmit power reduction factor based on the interference associated with a VDSL transmission. Likewise, the VDSL device may also estimate a transmit power reduction factor based on the interference associated with a PLC transmission. Each device can then reduce its transmit power by the appropriate transmit power reduction factor. This technique may be referred to as "symmetric interference reduction technique" and will be further described in FIGS. 1 and 5. In another embodiment, functionality for estimating the interference and reducing the transmit power may be implemented on either the PLC device or the VDSL device. This technique may be referred to as "asymmetric interference reduction technique" and will be further described in FIGS. 1 and 6. The mechanisms described below can help minimize mutual interference between proximate communication networks. The network devices of at least one of the proximate communication networks may transmit at a determined transmit power to minimize interference with the other communication network without causing performance degradation within its communication network.

FIG. 1 is a block diagram illustrating an example mechanism for minimizing interference between communication networks. FIG. 1 depicts communication networks 100 and 110. The communication network 100 includes a network device 102; while the communication network 110 includes a network device 112. The network device 102 includes an interference detection module 104, a transmit power estimation module 106, and a coexistence module 108. Similarly, the network device 112 includes an interference detection module 114, a transmit power estimation module 116, and a coexistence module 118. The coexistence modules 108 and 118 are depicted using dashed lines to indicate that they are optional, i.e., the network devices 102 and 112 may or may not include the coexistence module (e.g., coexistence functionality) depending on the implementation, as will be described further below. Additionally, depending on the implementation, the communication network 100 may or may not be communicatively coupled with the communication network 110 via an alternate communication network (depicted using a dashed line). Although not depicted in FIG. 1, the communication networks 100 and 110 may each include multiple network devices. Also, multiple network devices in each communication network may include an interference detection module, a transmit power estimation module, and/or a coexistence module similarly as depicted for the network devices 102 and 112.

In some embodiments, the communication network 100 may be a PLC network. For example, the communication network 100 may implement HomePlug® AV/AV2/GreenPHY protocols, G.hn protocols, or other suitable protocols that use a powerline medium for communication. In one embodiment, the network device 102 may be any suitable electronic device, such as a dedicated PLC device, a desktop computer, a laptop computer, a tablet computer, a television set-top box, a gaming console, and a smart appliance that includes hardware, software, and/or firmware to implement PLC protocols for communication. For example, a dedicated PLC device may be a PLC modem. In some embodiments, the communication network 110 may be a VDSL network. For example, the communication network 110 may implement G.fast protocols or other suitable protocols that use telephone lines for communication. In some embodiments, the network device 112 may be any suitable electronic device, such as a dedicated VDSL device or another electronic device that includes hardware, software, and/or firmware to implement VDSL protocols for communication. For example, a dedicated VDSL device may be a VDSL modem.

Figure 2:
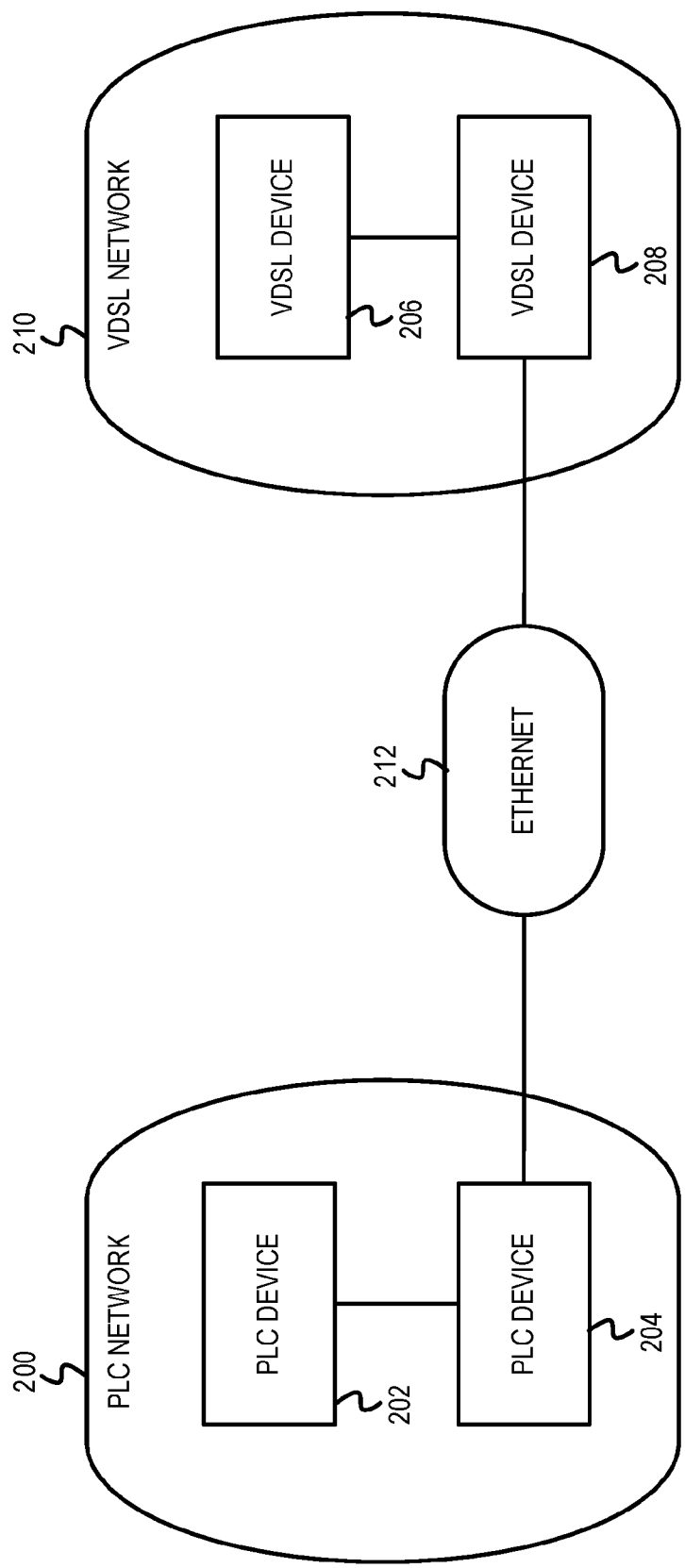
FIG. 2 is an example conceptual diagram illustrating proximate communication networks that are communicatively coupled via an alternate communication network for coordinated interference mitigation.

In one embodiment, the network devices 102 and 112 can actively coordinate with each other via an alternate communication network to determine how to minimize interference. This technique may be referred to as a "coordinated interference reduction technique." In this embodiment, network devices in the interfering communication networks 100 and 110 may exchange coexistence messages to determine how to minimize interference between the communication networks 100 and 110. The interference between two communications networks is also referred to as "mutual interference." FIG. 2 is an example conceptual diagram of a PLC network 200 communicatively coupled with a VDSL network 210 via Ethernet 212 for coexistence using the coordinated interference reduction technique. The PLC network 200 includes PLC devices 202 and 204; while the VDSL network 210 includes VDSL devices 206 and 208. In the example of FIG. 2, the PLC device 204 is communicatively coupled with the VDSL device 208 of the VDSL network 210 via the Ethernet 212. The PLC device 204 and the VDSL device 208 may use the Ethernet to manage coexistence of the two technologies. In some embodiments, as depicted in FIG. 2, one PLC device 204 (e.g., a network device including a PLC modem) and one VDSL device 208 (e.g., a network device including a VDSL modem) may be coupled with each other via Ethernet 212. The PLC device 204 and the VDSL device 208 may exchange coexistence messages on behalf of other PLC devices and other VDSL devices, respectively, to minimize interference between the networks 200 and 210. In other embodiments, some or all of the PLC devices of the PLC network 200 may be coupled with some/all of the VDSL devices of the VDSL network 210. In this embodiment, some/all of the PLC devices may directly exchange coexistence messages with some/all of the interfering VDSL devices (and vice versa) to reduce mutual interference. Although FIG. 2 describes using Ethernet to communicatively couple the PLC network 200 and the VDSL network 210 for the coordinated interference reduction technique, embodiments are not so limited. In other embodiments, other suitable wired or wireless communication networks may be used to communicatively couple the PLC network 200 and the VDSL network 210. For example, the PLC device 204 and the VDSL device 208 may use a wireless local area network (WLAN) communication protocol, such as an IEEE 802.11 communication protocol, a multimedia over coax alliance (MoCA) communication protocol, or another suitable communication protocol to implement the coordinated interference reduction technique. In other embodiments, the PLC device 204 and the VDSL device 208 may use PLC protocols or VDSL communication protocols to implement the coordinated interference reduction technique.

Referring back to FIG. 1, for the coordinated interference reduction technique, the coexistence modules 108 and 118 may exchange coexistence messages via the Ethernet to determine whether to share resources or reduce their transmit power. The coexistence modules 108 and 118 may determine whether to share resources or reduce the transmit power depending on the interference (also referred to as "interference level") between the communication networks 100 and 110. Sharing resources may include sharing transmission time on the communication medium, sharing frequency channels (or frequency bands) of a frequency spectrum, etc. If the interference between the network devices 102 and 112 is low, the network device 102 and/or the network device 112 may reduce their respective transmit power to minimize the interference. For example, the network devices 102 and/or 112 may reduce the transmit power if the interference lies below an interference threshold. In one implementation, the interference threshold may be predefined at the network devices 102 and 112. In another implementation, the interference threshold may be dynamically determined by the network devices 102 and/or 112. As another example, the network devices 102 and/or 112 may reduce the transmit power if the interference exceeds a lower interference threshold but does not exceed an upper interference threshold. In one embodiment, the coexistence modules 108 and 118 may exchange coexistence messages to negotiate a transmit power reduction factor to decrease the transmit power. In another embodiment, the transmit power estimation module 106 may estimate the transmit power reduction factor for the network device 112. The coexistence module 108 may notify the coexistence module 118 to reduce the transmit power of the network device 112 by the transmit power reduction factor determined by the network device 102. In another embodiment, the transmit power estimation module 116 may estimate the transmit power reduction factor for the network device 102. The coexistence module 118 may notify the coexistence module 108 to reduce the transmit power of the network device 102 by the transmit power reduction factor determined by the network device 112.

If the interference between the network devices 102 and 112 is high, the coexistence modules 108 and 118 may exchange coexistence messages to determine how to share communication resources. For example, the network devices 102 and 112 may determine to share the communication resources if the interference determined by the interference detection module 104 and/or 114 exceeds the interference threshold. As another example, the network devices 102 and 112 may determine to share the communication resources if the interference exceeds both the lower interference threshold and the upper interference threshold. Alternatively, the network devices 102 and 112 may determine to share the communication resources if reducing the transmit power at the network device 102 (and/or the network device 112) will cause performance degradation in the communication network 100 (and/or the communication network 110). The coexistence modules 108 and 118 may exchange coexistence messages via the alternate communication network to determine whether the network devices 102 and 112 should share the communication resources in time or in frequency. To share the communication resources in time, each network device may transmit messages during an assigned communication time slot. To share the communication resources in frequency, each network device may transmit messages on a set of assigned frequency channels (or frequency sub-bands). Operations for the coordinated interference reduction technique will be further described in FIGS. 3-4.

In another embodiment, network devices from both the interfering communication networks 100 and 110 may each execute operations to determine the interference and reduce their respective transmit power. This technique may be referred to as a symmetric interference reduction technique." The interference detection module 104 may detect a preamble of a transmission initiated by the network device 112. The interference detection module 104 may determine the interference caused by the network device 112 (at the network device 102) based on the signal strength of the detected preamble. The transmit power estimation module 106 may determine by how much to reduce the transmit power ("transmit power reduction factor") of the network device 102 based on the interference associated with the network device 112. Likewise, for the network device 112, the interference detection module 114 may detect a preamble of a transmission initiated by the network device 102. The interference detection module 114 may determine the interference caused by the network device 102 (at the network device 112) based on the signal strength of the detected preamble. The transmit power estimation module 116 may determine a transmit power reduction factor of the network device 112 based on the interference associated with the network device 102. The network devices 102 and 112 may reduce their respective transmit power by the determined transmit power reduction factor. The network devices 102 and 112 can iteratively reduce their respective transmit power to minimize interference between the proximate communication networks 100 and 110. Operations for the symmetric interference reduction technique will be further described in FIG. 5.

In another embodiment, either the network device 102 or the network device 112 may execute operations to determine the interference and minimize the transmit power. This technique may be referred to as an asymmetric interference reduction technique." In other words, a network device from one of the interfering communication networks 100 and 110 may reduce its transmit power to minimize interference to the other communication network. In one implementation, the network device with a lower priority (e.g., the network device 102) may estimate the interference generated by the network device with the higher priority (e.g., the network device 112). The interference detection module 104 may estimate the attenuation (also referred to as "attenuation level") between the network devices 102 and 112 in response to detecting transmissions from the network device 112. The transmit power estimation module 106 may determine the transmit power reduction factor assuming attenuation symmetry and based on knowledge of the minimum power that can be detected by the network device 112 and the attenuation between the network devices 102 and 112. The network device with the lower priority may then reduce its transmit power to minimize interference to the network device with the higher priority. In one example, the PLC device may have a lower priority as compared to the VDSL device. In this example, the PLC device may detect a VDSL transmission and reduce its transmit power to minimize interference with the VDSL device. In this example, the VDSL device may not reduce its transmit power or try to minimize interference caused to the PLC device. However, in another example, the VDSL device may detect a PLC transmission and reduce its transmit power to minimize interference with the PLC device. In this example, the PLC device may not reduce its transmit power or try to minimize interference caused to the VDSL device. Operations for the asymmetric interference reduction technique will be further described in FIG. 6.

Figure 3:
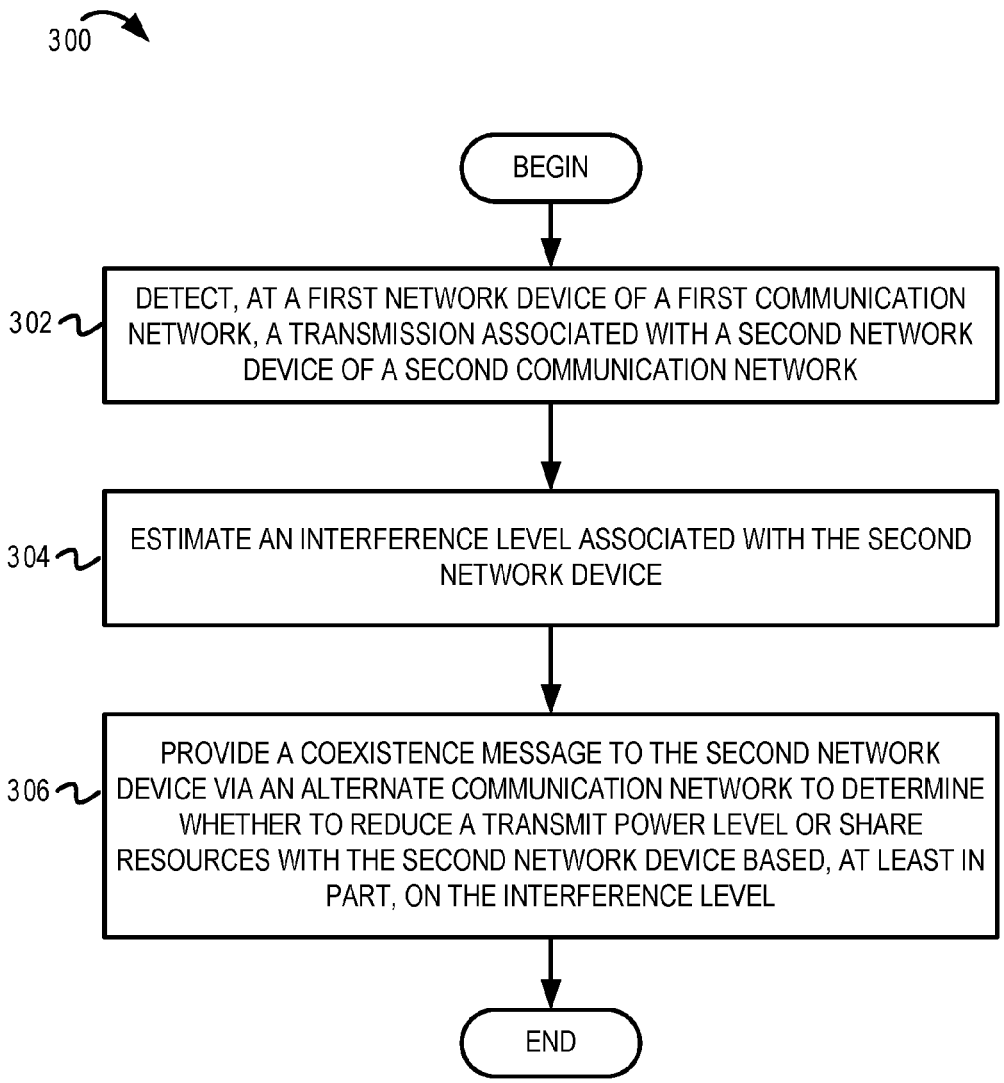
FIG. 3 is a flow diagram illustrating example operations for active coordination to minimize interference between communication networks.

FIG. 3 is a flow diagram ("flow") 300 illustrating example operations for active coordination to minimize interference between communication networks. The flow 300 begins at block 302.

At block 302, a first network device of a first communication network detects a transmission associated with a second network device of a second communication network. Referring to FIG. 1, the interference detection module 104 of the network device 102 may detect a transmission initiated by the network device 112. In one example, a PLC device may detect a transmission initiated by a VDSL device in a proximate VDSL network. In another example, the VDSL device may detect a transmission initiated by a PLC device in a proximate PLC network. Various techniques may be employed to detect a transmission associated with the second network device. In one embodiment, the first network device may implement a preamble detection mechanism to detect the preamble of the transmission associated with the second network device. In another embodiment, the first network device may identify a transmission by detecting an increase in the signal strength detected at the first network device. The flow continues at block 304.

At block 304, the first network device estimates an interference associated with the second network device. For example, the interference detection module 104 may estimate the interference associated with the network device 112 based, at least in part, on the transmission generated by the network device 112. In some embodiments, the first network device may estimate the interference associated with the second network device based, at least in part, on the signal strength of the preamble of the second network device. In another embodiment, the first network device may determine the interference associated with the second network device based, at least in part, on an estimated attenuation between the first network device and the second network device. In some embodiments, the first network device may determine multiple interference measurements over a time interval. The first network device may determine an average interference measurement by combining the multiple interference measurements. As will be further described below, the first network device may use the interference to determine whether to reduce its transmit power or share communication resources with the second network device. Using the average interference measurement can help minimize the effects of background noise and transmissions from other devices (e.g., that do not belong to the second communication network) on the estimate of the interference associated with the second network device. The flow continues at block 306.

At block 306, the first network device provides a coexistence message to the second network device via an alternate communication network to determine whether to reduce the transmit power or share resources with the second network device based, at least in part, on the interference. For example, the coexistence module 108 may exchange coexistence messages with the coexistence module 118 to determine how to minimize interference between the communication networks 100 and 110. The interference between the communication networks 100 and 110 may also be referred to as "mutual interference." In one implementation, as shown in FIG. 2, the PLC network 200 may be coupled with the VDSL network 210 via the Ethernet 212. In this example, the PLC device 204 and the VDSL device 208 can actively coordinate with each other via the Ethernet 212 to determine how to minimize mutual interference. The PLC device 204 and the VDSL device 208 may exchange Ethernet coexistence messages via the Ethernet 212 to determine whether and by how much to reduce the transmit power, whether and how to share communication resources, whether the detected interference has decreased, etc.

The first network device may determine the interference based on a detected transmission of the second network device. In one embodiment, the first network device may use two interference thresholds to determine how to minimize the interference—a lower interference threshold and an upper interference threshold. If the interference does not exceed the lower interference threshold, the first network device may determine not to reduce the transmit power and not to share resources (e.g., not take any action). If the interference exceeds the lower interference threshold but does not exceed the upper interference threshold, the first network device may determine that mutual interference can be minimized by reducing the transmit power. If the interference exceeds the upper interference threshold, the first network device may determine that mutual interference cannot be minimized by simply reducing the transmit power. In this case, the first network device may determine to share communication resources with the second network device. In another embodiment, the first network device may use one interference threshold to determine how to minimize the interference. If the interference exceeds the interference threshold, the first network device may determine that mutual interference can be minimized by reducing the transmit power. If the interference exceeds the interference threshold, the first network device may determine to share communication resources with the second network device.

If the first network device determines to reduce its transmit power, the first network device can exchange coexistence messages with the second network device to determine a transmit power reduction factor. The first network device may reduce its transmit power by the transmit power reduction factor and may initiate subsequent transmissions using the reduced transmit power. In some embodiments, the first network device may also transmit a coexistence message to the second network device to indicate by how much the second network device should reduce its transmit power. In some embodiments, after determining the transmit power reduction factor, the first network device may determine whether reducing the transmit power will degrade the performance of the first communication network. In another embodiment, the first network device may receive a coexistence message from the second network device indicating whether reducing the transmit power of the second network device will degrade the performance of the second communication network. The network devices 102 and 112 may determine to share communication resources if reducing the transmit power will degrade the performance of the first and/or the second communication networks. If the first network device determines to share the communication resources, the first network device may exchange coexistence messages with the second network device to determine how to share the communication resources. For example, the coexistence modules 108 and 118 may exchange coexistence messages to allocate unique communication time slots and/or unique communication frequency channels to the network devices 102 and 112 as will be further described in FIG. 4. From block 306, the flow ends.

Figure 4:
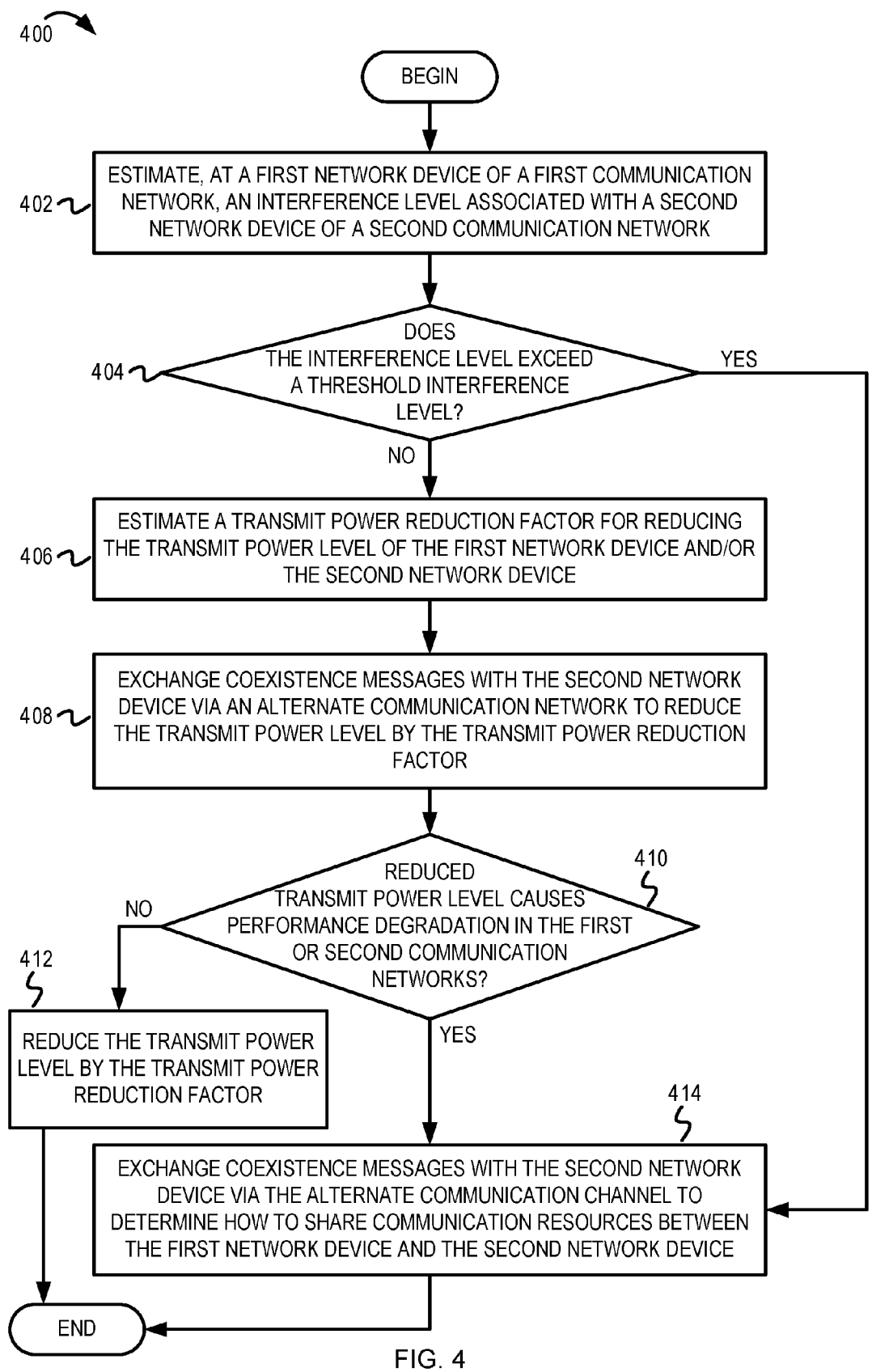
FIG. 4 is a flow diagram illustrating example operations for active coordination to determine how to minimize interference between communication networks.

FIG. 4 is a flow diagram 400 illustrating example operations for active coordination to determine how to minimize interference between communication networks. The flow 400 begins at block 402.

At block 402, a first network device of a first communication network estimates the interference associated with a second network device of a second communication network. Referring to the example of FIG. 1, the interference detection module 104 may determine the interference caused by the network device 112 at the network device 102. In one example, a PLC device of a PLC network may estimate the interference associated with a VDSL device of a proximate VDSL network. As another example, the VDSL device may estimate the interference associated with the PLC device. In some embodiments, the first network device may coordinate with the second network device to measure the interference attributable to the second network device. The first network device and the second network device may exchange coexistence messages to determine which network device should transmit during a time interval and which network device should detect the interference. For example, based on exchanging coexistence messages, the PLC device may determine to transmit during a first time interval. During the first time interval, the VDSL device may listen for transmissions from the PLC device and measure the interference associated with the PLC device. To determine the interference, the VDSL device may notify all other VDSL devices in the VDSL network to temporarily defer transmissions during the first time interval. This can ensure that transmissions detected during the first time interval were generated by PLC devices in the PLC network. The VDSL device may estimate the interference based on the transmissions of the PLC device that were detected during the first time interval.

Likewise, the VDSL device may transmit during a second time interval; while the PLC device may determine the interference associated with the VDSL device based on PLC transmissions received during the second time interval. To determine the interference, the PLC device may notify all other PLC devices in the PLC network to temporarily defer transmissions during the second time interval. This can ensure that transmissions detected during the second time interval were generated by VDSL devices in the VDSL network.

Additionally, in some embodiments, the first network device and the second network device may also coordinate to select a quiet time interval for measuring the background noise. None of the network devices in the first communication network and the second communication network may transmit any messages during the quiet time interval. Accordingly, the noise measured during the quiet time interval may not be associated with either the first communication network or the second communication network. Instead, the noise measured during the quiet time interval may include environmental noise, noise on the powerline medium caused by electronic devices connected to the power lines, etc.

The first network device (e.g., the PLC device or the VDSL device) may implement various techniques to determine the interference associated with the second network device. For example, the first network device may detect a preamble of the transmission received at the first network device from the second network device. The preamble is typically transmitted using a robust transmission scheme and may include short repeated orthogonal frequency division multiplexing (OFDM) symbols. The first network device may correlate a received signal and a predefined signal to determine whether the received signal includes the preamble of the second network device. If there is a peak in the correlation result, this can indicate that the received signal includes the preamble of the second network device (e.g., that the received signal was generated by the second network device). For preamble detection, the first network device may have a priori knowledge of the characteristics of the second network device such as, symbol duration, phase of the transmission, etc.

The first network device may determine the interference based, at least in part, on the signal strength of the detected preamble. For example, the first network device may determine the interference associated with the second network device using the received signal strength indicator (RSSI) measurement of the detected preamble, automatic gain control (AGC) settings of the first network device, or another suitable signal strength measurement. In one embodiment, the first network device may subtract a power detection threshold and the background noise from the signal strength to yield the interference associated with the second network device. The power detection threshold may represent the minimum signal strength that may be detected by the first network device. The power detection threshold may depend on the receiver sensitivity, noise in the first communication network, and other such factors. For example, the first network device may detect a −80 dB signal from the second network device. If the power detection threshold of the first network device is −140 dB, the interference may be −60 dB (e.g., −140 dB−−80 dB). After determining the interference associated with the second network device, the flow continues at block 404.

At block 404, the first network device determines whether the interference exceeds an interference threshold. For example, the interference detection module 104 may determine whether the interference associated with the second network device exceeds the interference threshold. The interference threshold may be determined based on the maximum amount of interference that can be tolerated at the first network device, the power detection threshold of the first network device, the background noise of the first communication network, and/or other suitable factors. In some embodiments, the first network device may use two interference thresholds to determine whether to reduce the transmit power or share resources with the second network device. If the interference exceeds a lower interference threshold but does not exceed an upper interference threshold, the first network device may determine to reduce the transmit power and the flow continues at block 406. If the interference exceeds both the lower and the upper interference thresholds, the first network device may determine to share communication resources with the second network device and the flow continues at block 414. Although not depicted in FIG. 4, if the interference does not exceed the first interference threshold, the first network device may determine not to take any action (e.g., not to reduce the transmit power and not to share resources with the second network device). The first network device may transmit a coexistence message to the second network device indicating that the interference is below the first interference threshold. The first network device may continue to monitor the interference generated by the second network device. In another embodiment, the first network device may use a single interference threshold to determine whether to reduce the transmit power or share resources with the second network device. If the interference does not exceed the interference threshold, the first network device may determine to reduce the transmit power and the flow continues at block 406. If the interference exceeds the interference threshold, the first network device may determine to share communication resources with the second network device and the flow continues at block 414.

At block 406, a transmit power reduction factor is estimated for reducing the transmit power of the first network device and/or the second network device. For example, the transmit power estimation module 106 may estimate the transmit power reduction factor for the first network device and/or the second network device to minimize the interference. In one embodiment, the coexistence module 108 may exchange coexistence messages with the coexistence module 118 to determine whether one or both of the network devices should reduce their respective transmit power. In one embodiment, the first network device and the second network device may negotiate with each other and agree on a single transmit power reduction factor for decreasing the transmit power. In this embodiment, the first network device and the second network device may each determine to reduce their respective transmit power by the same transmit power reduction factor. For example, the transmit power reduction factor for the first network device may be half the amount of the interference associated with the second network device. In this example, if the first network device detects an interference of −15 dB, the first and the second network devices may each reduce their transmit power by −7.5 dB, resulting in an overall transmit power reduction of −15 dB and effectively zero interference. In another embodiment, the first network device and the second network device may exchange coexistence messages and determine a different transmit power reduction factor for decreasing the transmit power of the first network device and the second network device. For example, the transmit power reduction factor for the first network device may be any suitable percentage of the amount of the interference associated with the second network device. In another embodiment, the first network device may determine the transmit power reduction factor for reducing the transmit power of the second network device based, at least in part, on the interference associated with the second network device.

In another embodiment, the first network device may receive a coexistence message from the second network device that indicates the amount by which the first network device should reduce its transmit power. In another embodiment, the first network device may receive a coexistence message from the second network device indicating the interference associated with the first network device that was detected at the second network device. The first network device may determine the transmit power reduction factor for reducing its transmit power based, at least in part, on the amount of interference detected by the second network device and caused by the first network device. For example, the transmit power reduction factor for the first network device may be half the amount of the interference associated with the first network device. As another example, the transmit power reduction factor for the first network device may be any suitable percentage of the amount of the interference associated with the first network device. In another embodiment, the first network device may exchange coexistence messages with the second network device to select a predefined transmit power reduction factor. The first network device may reduce its transmit power by the predefined transmit power factor irrespective of the interference associated with the second network device or the interference associated with the first network device. In another embodiment, the first network device may exchange coexistence messages with the second network device to select multiple predefined transmit power reduction factors for multiple interference ranges. For example, if the interference associated with the second network device falls within a first interference range, the first network device may select a first predefined transmit power reduction factor. If the interference falls within a second interference range, the first network device may select a second predefined transmit power reduction factor, and so on. In another embodiment, the first network device may receive a coexistence message from the second network indicating the power detection threshold or detection sensitivity of the second network device. The first network device may select the transmit power reduction factor so that the interference generated by the first network device at the second network device is below the power detection threshold of the second network device. In another embodiment, the first network device may receive a coexistence message from the second network indicating the interference threshold of the second network device. The first network device may select the transmit power reduction factor so that the interference generated by the first network device at the second network device is below the interference threshold of the second network device. The flow continues at block 408.

At block 408, the first network device exchanges coexistence messages with the second network device, via an alternate communication network, to reduce the transmit power by the transmit power reduction factor. In one embodiment, the PLC device may exchange coexistence messages with the VDSL device via an Ethernet to reduce the transmit power of the PLC device and/or the VDSL device. Referring to FIG. 1, the coexistence module 108 may exchange coexistence messages with the coexistence module 118 via the alternate communication network. In one example, as described above, the first network device and the second network device may exchange coexistence messages and determine a transmit power reduction factor for decreasing the transmit power of the first network device and/or the second network device. As another example, the first network device may notify the second network device via the Ethernet to reduce its transmit power by a transmit power reduction factor determined based on the amount of interference associated with the second network device. The first network device may also determine to reduce its transmit power by the same or a different transmit power reduction factor. In another example, the first network device may receive a notification from the second network device indicating the transmit power reduction factor for reducing the transmit power of the first network device. In some embodiments, the first network device may notify the second network device to reduce the transmit power and may determine not to reduce its transmit power based on a message received from the second network device. For example, the PLC device may detect interference from the VDSL network but the VDSL device may not detect interference from the PLC network. In this example, the PLC device may notify the VDSL device to reduce its transmit power. However, the PLC device may receive a message from the VDSL device indicating that the PLC device should not reduce its transmit power. The flow continues at block 410.

At block 410, the first network device determines whether the reduced transmit power will cause performance degradation in the first or second communication networks. For example, the transmit power estimation module 106 may simulate or estimate the effect of reducing the transmit power of the network device 102 by the transmit power reduction factor. As another example, the coexistence module 108 may receive a coexistence message from the coexistence module 118. The coexistence message may indicate that reducing the transmit power will degrade the performance of the second communication network 110. If reducing the transmit power will cause performance degradation in either the first or the second communication networks, the flow continues at block 414. Otherwise, the flow continues at block 412.

At block 412, the first network device reduces the transmit power by the transmit power reduction factor. The first network device may initiate subsequent transmissions in the first communication network using the reduced transmit power. In some embodiments, the first network device may receive a coexistence message indicating that the transmit power of the second network device was reduced by the transmit power reduction factor. From block 412, the flow ends. Although FIG. 4 depicts the flow ending after block 412, embodiments are not so limited. In other embodiments, the first network device may continue to monitor the interference associated with the second network device (e.g., the flow 400 may move from block 412 to block 402).

At block 414, the first network device exchanges coexistence messages with the second network device via the alternate communication network to determine how to share communication resources between the first network device and the second network device. For example, the coexistence module 108 may exchange coexistence messages with the coexistence module 118 to determine how to share the communication resources. In one embodiment, if the first network device uses one interference threshold to determine how to minimize the interference, the first network device may determine to share the communication resources with the second network device if the interference associated with the second network device exceeds the interference threshold. In another embodiment, if the first network device uses two interference thresholds to determine how to minimize the interference, the first network device may determine to share the communication resources with the second network device if the interference associated with the second network device exceeds both the lower and the upper interference thresholds. In another embodiment, if reducing the transmit power will cause performance degradation in the first communication network or the second communication network, the first network device may determine to share communication resources with the second network device.

In some embodiments, the first network device and the second network device may exchange coexistence messages to divide the transmission time into multiple communication time slots. In this embodiment, each network device may be allocated communication time slots for exclusive use by the network device. For example, the PLC device may transmit and receive communications during the communication time slots allocated to the PLC device. The VDSL device may transmit and receive communications during the communication time slots allocated to the VDSL device. The PLC device may not transmit or receive communications during the communication time slots allocated to the VDSL device. Likewise, the VDSL device may not transmit or receive communications during the communication time slots allocated to the PLC device. In another embodiment, the first network device and the second network device may exchange coexistence messages to divide a communication frequency band into multiple frequency sub-bands. In this embodiment, each network device may be allocated one or more frequency sub-bands for exclusive use by the network device. For example, the PLC device may transmit and receive communications on the frequency sub-bands allocated to the PLC device. The VDSL device may transmit and receive communications on the frequency sub-bands allocated to the VDSL device. The PLC device may not transmit or receive communications on the frequency sub-bands allocated to the VDSL device. Likewise, the VDSL device may not transmit or receive communications on the frequency sub-bands allocated to the PLC device. From block 414, the flow ends.

In some embodiments, after reducing the transmit power or sharing the communication resources, the first network device and the second network device may continue to exchange coexistence messages and monitor the interference. For example, after reducing the transmit power or sharing the communication resources, the PLC device may continue to monitor the interference associated with the VDSL device. The PLC device may notify the VDSL device of the detected interference and receive updates regarding the interference detected by the VDSL device. The PLC device and the VDSL device may communicate with each other to determine whether to further reduce, increase, or maintain their respective transmit power. In one example, the PLC device may notify the VDSL device to increase its transmit power if the PLC device does not detect any interference from the VDSL network, if the PLC device will not be exchanging any messages in the PLC network, or if the PLC device will operate in a low-power mode. As another example, the VDSL device may notify the PLC device to increase its transmit power if the VDSL device does not detect any interference from the PLC network, if the VDSL device will not be exchanging any messages in the VDSL network, or if the VDSL device will operate in a low-power mode. The PLC device and the VDSL device may communicate with each other to determine whether to transmit at a maximum transmit power and share communication resources instead. For example, after reducing the transmit power to minimize interference with the VDSL network, the PLC device may detect a performance degradation in the PLC network. Accordingly, the PLC device may transmit coexistence message to the VDSL device indicating that the PLC device will increase its transmit power (e.g., to the maximum transmit power). The PLC device may also request the VDSL device to exchange coexistence messages to determine how to share communication resources.

In FIGS. 3-4, the first network device and the second network device coordinate with each other to determine whether and how to reduce mutual interference. However, in other embodiments, the first network device and/or the second network device may independently attempt to reduce the interference generated at the other network device. In the symmetric interference reduction technique described in FIG. 5, both the first network device and the second network device may share the responsibility for reducing their respective transmit power. For example, if there is interference between a PLC device and a VDSL device, the PLC device and the VDSL device may independently reduce their respective transmit power to minimize mutual interference without any input or collaboration between the network devices. In the asymmetric interference reduction technique described in FIG. 6, either the PLC device or the VDSL device may reduce the transmit power to minimize interference to the other network device. In one embodiment, the network device associated with a lower priority may execute operations to reduce the transmit power. The network device associated with the higher priority may not reduce its transmit power.

Figure 5:
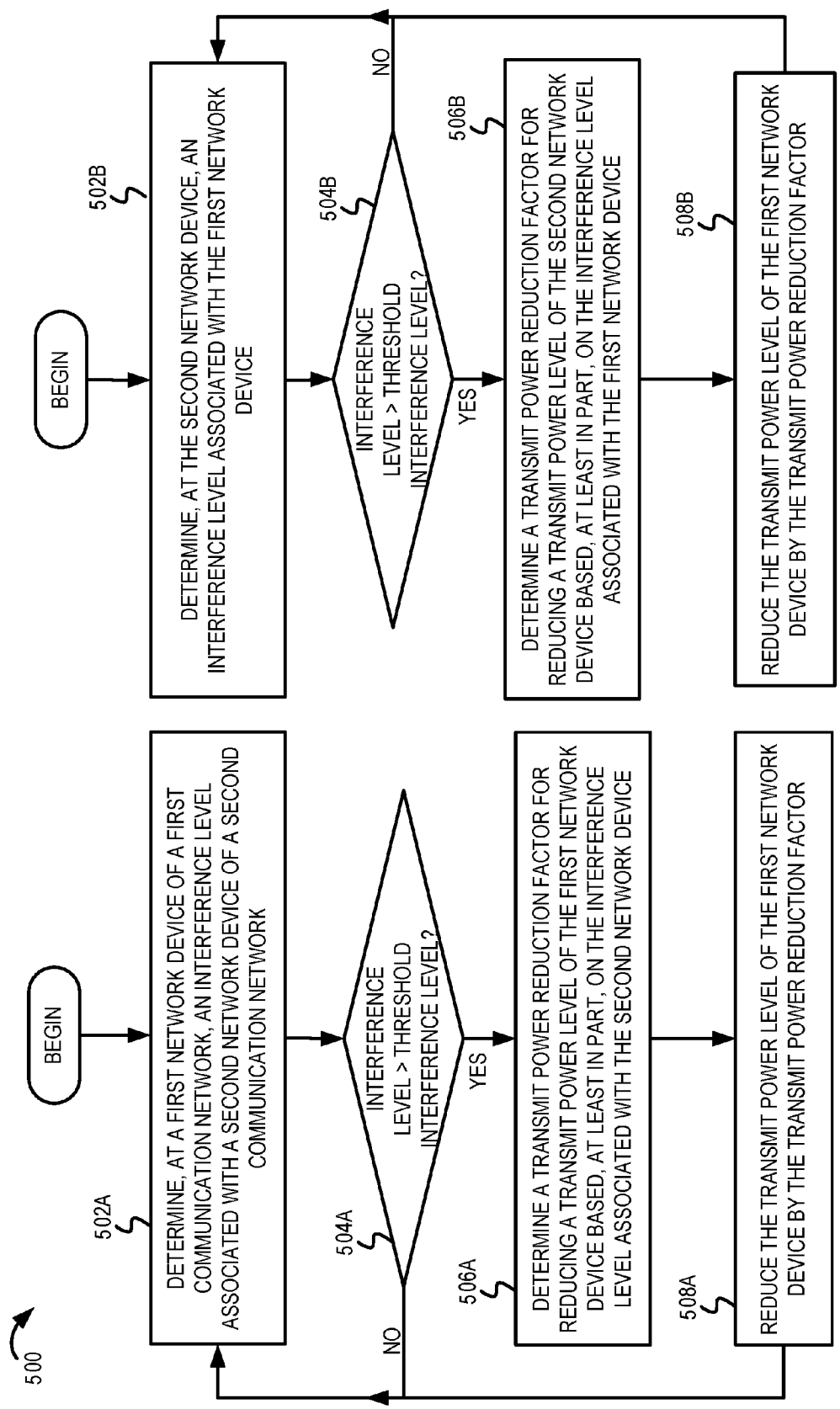
FIG. 5 is a flow diagram illustrating example operations of a symmetric technique for minimizing interference between communication networks.

FIG. 5 is a flow diagram 500 illustrating example operations of a symmetric technique for minimizing interference between communication networks. The flow 500 begins at blocks 502A and 502B. In the symmetric technique, a first network device of a first communication network and a second network device of a second communication network independently execute operations to determine by how much to reduce their respective transmit power. Blocks 502A-508A are executed by the first network device to determine by how much to reduce the transmit power of the first network device. Blocks 502B-508B are independently executed by the second network device to determine by how much to reduce the transmit power of the second network device.

At block 502A, the first network device of the first communication network determines an interference associated with the second network device of the second communication network. For example, the interference detection module 104 may determine the interference generated by the network device 112 at the network device 102. In some embodiments, the first network device may detect the preamble of a transmission initiated by the second network device. The first network device may then estimate the interference generated by the second network device based, at least in part, on the signal strength of the detected preamble. In some embodiments, the first network device may include preamble detection functionality. For example, the interference detection module 104 may be configured to detect the preamble of transmissions generated by the second network device. In some embodiments, the first network device may be a PLC device and the second network device may be a VDSL device. In one example, the interference detection module 104 that is used to detect a PLC preamble may also be configured to detect a VDSL preamble. The first network device may determine the signal strength of the detected preamble of the second network device relative to the power detection threshold (or detection sensitivity) of the first network device. The power detection threshold of the first network device may refer to the minimum received signal strength that can be detected by the first network device. For example, if the power detection threshold of the first network device is −50 dB and the signal strength of the received preamble is −20 dB, the interference may be calculated as a difference of the signal strength and the detection sensitivity (e.g., −30 dB).

Likewise, at block 502B, the second network device determines an interference associated with the first network device. For example, the interference detection module 114 may determine the interference generated by the network device 102 at the network device 112. For example, the VDSL device may detect the preamble of a transmission initiated by the PLC device. The VDSL device may execute similar operations described above to determine the interference associated with the second network device based, at least in part on the signal strength of the preamble of the PLC device. From block 502A, the flow continues at block 504A. From block 502B, the flow continues at block 504B.

At block 504A, the first network device determines whether the interference associated with the second network device exceeds an interference threshold. The interference threshold may represent the maximum amount of interference that can be tolerated at the first network device. Likewise, at block 504B, the second network device may determine whether the interference associated with the first network device exceeds an interference threshold. In some embodiments, the interference threshold that is used by the first network device may be different from the interference threshold that is used by the second network device. The first network device and the second network device may independently compare the detected interference against an appropriate interference threshold to determine whether to reduce the transmit power. From block 504A, if the interference associated with the second network device exceeds the interference threshold, the flow continues at block 506A. Otherwise, the flow loops back to block 502A where the first network device continues to monitor the interference associated with the second network device. Likewise, from block 504B, if the interference exceeds the interference threshold, the flow continues at block 506B. Otherwise, the flow loops back to block 502B where the second network device continues to monitor the interference associated with the first network device.

At block 506A, the first network device determines a transmit power reduction factor to reduce the transmit power of the first network device based, at least in part, on the interference associated with the second network device. For example, the transmit power estimation module 106 may determine the transmit power reduction factor for the network device 102. The first network device may assume a reciprocal communication channel between the first network device and the second network device. In other words, the first network device may determine that the second network device detects the same amount of interference from the first network device as was detected by the first network device from the second network device. For example, if the first network device detects a −15 dB interference from the second network device, the first network device may assume that the second network device also detects a −15 dB interference from the first network device. In some embodiments, the transmit power reduction factor for the first network device may be a function of (e.g., proportional to) the interference associated with the second network device. For example, the transmit power reduction factor for the first network device may be half the amount of the interference associated with the second network device. In this example, if the PLC device detects an interference of −15 dB, the PLC may device may assume that the VDSL device may also detect an interference of −15 dB. The PLC device may determine to reduce its transmit power by −7.5 dB. In the symmetric interference reduction technique, the VDSL device may also reduce its transmit power by −7.5 dB, resulting in an overall transmit power reduction of −15 dB and effectively zero interference. As another example, the transmit power reduction factor for the first network device may be any suitable percentage of the amount of the interference associated with the second network device. In another embodiment, the first network device may reduce its transmit power to eliminate interference at the second network device (e.g., so that the first network device generates zero interference at the second network device). In another embodiment, the first network device may determine to reduce its transmit power by a predefined transmit power reduction factor irrespective of the interference associated with the second network device. In another embodiment, the first network device may determine to reduce its transmit power by a different predefined transmit power reduction factor depending on the range in which the interference lies. For example, if the interference associated with the second network device falls within a first interference range, the first network device may select a first predefined transmit power reduction factor. If the interference falls within a second interference range, the first network device may select a second predefined transmit power reduction factor, and so on. In another embodiment, the first network device may have a priori knowledge of the minimum power that can be detected ("power detection threshold" or "detection sensitivity") by the second network device. The first network device may select the transmit power reduction factor so that the interference generated by the first network device at the second network device is below the power detection threshold of the second network device. In one example, the first network device may select the transmit power reduction factor so that the interference associated with the second network device is below the power detection threshold of the second network device. As another example, the first network device may select the transmit power reduction factor so that the transmit power of the first network device is below the power detection threshold of the second network device. In another embodiment, the first network device may reduce its transmit power so that the interference detected at the second network device is below an interference threshold implemented by the second network device. In one example, the first network device may select the transmit power reduction factor so that the interference associated with the second network device is below the interference threshold of the second network device. As another example, the first network device may select the transmit power reduction factor so that the transmit power of the first network device is below the interference threshold of the second network device.

Likewise, at block 506B, the second network device determines the transmit power reduction factor for reducing the transmit power of the second network device based, at least in part, on the interference associated with the first network device. For example, the transmit power estimation module 116 may use similar techniques described above to determine the transmit power reduction factor for the network device 112. In some embodiments, the first network device and the second network device may use the same technique to estimate their respective transmit power reduction factor. However, in other embodiments, the first network device and the second network device may use different techniques to estimate their respective transmit power reduction factor. The first network device and the second network device may determine their respective transmit power reduction factors independent of each other (e.g., without any communication or exchange of coexistence information). From block 506A, the flow continues at block 508A. From block 506B, the flow continues at block 508B.

At block 508A, the first network device reduces its transmit power by the transmit power reduction factor. The first network device may transmit subsequent messages in the first communication network at the reduced transmit power. Likewise, at block 508B, the second network device reduces its transmit power by the transmit power reduction factor. The second network device may transmit subsequent messages in the second communication network at the reduced transmit power. In some embodiments, the first network device and the second network device may independently determine the same transmit power reduction factor for reducing their respective transmit power. In another embodiment, the first network device may reduce its transmit power by a first transmit power reduction factor and the second network device may reduce its transmit power by a second transmit power reduction factor that is different from the first transmit power reduction factor. From block 508A, the flow loops back to block 502A where the first network device continues to monitor the interference associated with the second network device. From block 508B, the flow loops back to block 502B where the second network device continues to monitor the interference associated with the first network device.

The first network device (e.g., PLC device) and the second network device (e.g., VDSL device) can continue to independently monitor the interference attributable to the other network device. The PLC device may reduce its transmit power until it cannot detect transmissions from the VDSL device. When the PLC device cannot detect transmissions of the VDSL device, the PLC device may assume that its transmit power is sufficiently low so that the VDSL device cannot detect transmissions of the PLC device or the interference of the PLC device is below a detection threshold of the VDSL device. Likewise, the VDSL device may reduce its transmit power until it cannot detect transmissions from the PLC device.

Figure 6:
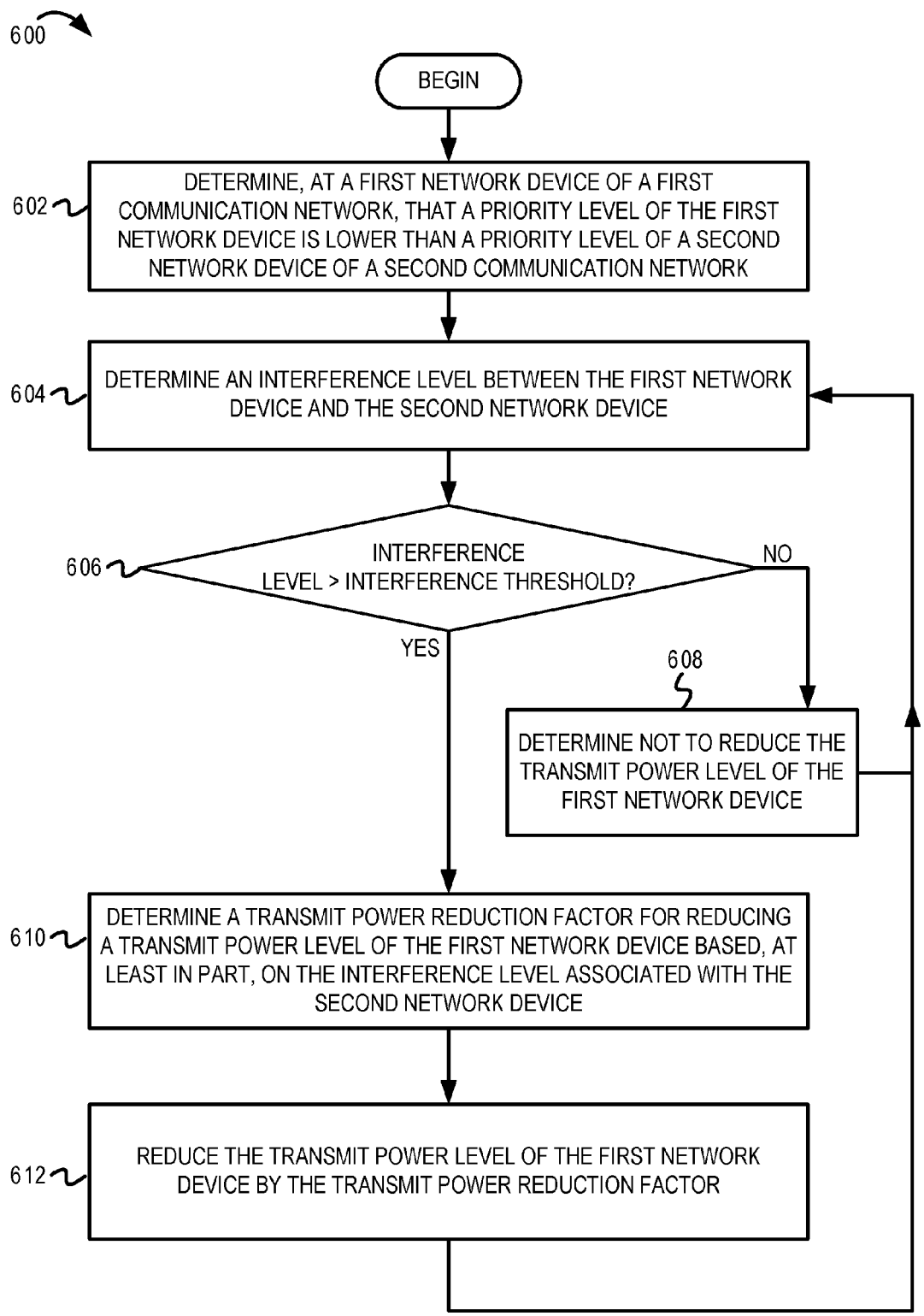
FIG. 6 is a flow diagram illustrating example operations of an asymmetric technique for minimizing interference between communication networks.

FIG. 6 is a flow diagram 600 illustrating example operations of an asymmetric technique for minimizing interference between communication networks. The flow begins at block 602.

At block 602, a first network device of a first communication network determines that the priority of the first network device is lower than the priority of a second network device of a second communication network. For example, the interference detection module 104 may determine that the network device 102 has a lower priority as compared to the network device 112. In one embodiment, transmissions of a PLC device of a PLC network may interfere with transmissions of a VDSL device of a proximate VDSL network. In the asymmetric interference reduction technique, either the PLC device or the VDSL device may reduce the transmit power to minimize interference to the other network device. For example, if the priority of the PLC device is lower than the priority of the VDSL device, the PLC device may reduce its transmit power to minimize interference detected by the VDSL device as will be further described below. The flow continues at block 604.

At block 604, the first network device determines the interference associated with the second network device. For example, the interference detection module 104 may determine the interference generated by the network device 112 at the network device 102. In one embodiment, the first network device may use a preamble detection technique to detect transmissions of the second network device for estimating the interference associated with the second network device as described above in FIG. 5. For example, the first network device may detect the preamble of transmissions initiated by the second network device. The first network device may use the signal strength of the detected preamble to estimate the interference associated with the second network device.

In another embodiment, the first network device may determine the signal strength of transmissions from the second network device without explicitly detecting the preamble of the second network device. The first network device may notify other network devices within the first communication network to defer transmissions during a predefined time interval. In doing so, the first network device may ensure that all the transmissions detected at the first network device are attributable to the second communication network. The first network device may estimate the attenuation from the second network device to the first network device based on knowledge of the transmit power of the second network device and the signal strength of the detected transmission. In some embodiments, the first network device may also take the background noise into consideration to determine the attenuation from the second network device to the first network device. For example, the PLC device may detect VDSL transmissions and estimate the attenuation between the VDSL device and the PLC device. The PLC device may assume that the transmit power of a VDSL transmission is constant at a known power spectral density (PSD). For example, the PLC device may detect a VDSL transmission at −120 dB and may have a priori knowledge that the VDSL device has a transmit power of −60 dB. In this example, the PLC device may determine that the attenuation from the VDSL device to the PLC device is 60 dBm. The attenuation between the first network device and the second network device may be representative of the interference associated with the second network device and may be used to estimate the transmit power reduction factor for the first network device as will be described below. After determining the interference associated with the second network device, the flow continues at block 606.

At block 606, the first network device determines whether the interference associated with the second network device exceeds an interference threshold. For example, the interference detection module 104 may determine whether the interference associated with the second network device exceeds the interference threshold. In one embodiment, the interference threshold may be 0 dB (i.e., no interference). In another embodiment, the interference threshold may be approximately equal to the power detection threshold or detection sensitivity of the second network device. In another embodiment, the interference threshold may be determined based, at least in part, on the noise level in the first communication network, the receiver sensitivities of the other network devices in the first communication network, performance requirements associated with the first communication network, etc. In another embodiment, the interference detection module 104 may use the attenuation between the network devices 102 and 112 to determine whether or not to reduce the transmit power of the network device 102. For example, if the attenuation between the first network device and the second network device exceeds an attenuation threshold, the first network device may determine not to reduce the transmit power of the first network device. If the attenuation does not exceed the attenuation threshold, the first network device may determine to reduce the transmit power of the first network device. If the interference associated with the second network device does not exceed the interference threshold, the flow continues at block 608. However, if the interference associated with the second network device exceeds the interference threshold, the flow continues at block 610.

At block 608, the first network device determines not to reduce the transmit power. If the interference generated by the second network device at the first network device does not exceed the interference threshold, then assuming channel reciprocity, the first network device determines that the interference generated by the first network device will not exceed the interference threshold at the second network device. From block 608, the flow loops back to block 604 where the first network device continues to monitor the interference generated by the second network device.

At block 610, the first network device determines a transmit power reduction factor to reduce the transmit power of the first network device based, at least in part, on the interference of the second network device. For example, the transmit power estimation module 106 may determine the transmit power reduction factor. The first network device may assume a reciprocal channel and determine that the second network device detects the same amount of interference (and attenuation) from the first network device as was detected by the first network device at block 604. Consequently, by reducing the transmit power at the first network device, the first network device may attempt to minimize the interference detected at the second network device. Referring to the above example, the first network device may determine a 60 dB attenuation from the second network device. To estimate the transmit power reduction factor, the first network device may assume that attenuation is symmetric and that the channel between the first and the second network devices is reciprocal. Accordingly, the first network device may determine that transmissions from the first network device are attenuated by 60 dB before being received by the first network device. The first network device may estimate a target transmit power based, at least in part, on the attenuation and knowledge of the power detection threshold of the second network device. The target transmit power may represent the maximum transmit power at which the first network device can initiate transmissions in the first communication network without causing interference at the second network device. In this example, the first network device may a priori knowledge that the second network device can detect a minimum power of −140 dB. Based on an attenuation of −60 dB and a power detection threshold of the second network device of −140 dB, the first network device may determine the target transmit power as −80 dB. In some embodiments, the transmit power reduction factor for the first network device may be determined from the target transmit power. For example, if the target transmit power is −80 dB and the current transmit power is −50 dB, the first network device may select a transmit power reduction factor of −30 dB. In another embodiment, the first network device may determine to reduce its transmit power by a predefined transmit power reduction factor irrespective of the attenuation and the target transmit power.

However, in some embodiments, the first network device may use the interference generated by the second network device to estimate the transmit power reduction factor. In some embodiments, the transmit power reduction factor for the first network device may be a function of (e.g., proportional to) the amount of interference generated by the second network device. For example, if the first network device detects a −15 dB interference from the second network device, the first network device may assume that the second network device also detects a −15 dB interference from the first network device. Because the second network device does not reduce its transmit power in the asymmetric interference reduction technique, the first network device may select a transmit power reduction factor of 15 dB. In another embodiment, the transmit power reduction factor for the first network device may be a suitable percentage of the amount of the interference associated with the second network device. In another embodiment, the first network device may reduce its transmit power to eliminate interference at the second network device (e.g., so that the first network device generates zero interference at the second network device). In another embodiment, the first network device may determine to reduce its transmit power by a predefined transmit power reduction factor irrespective of the interference associated with the second network device. In another embodiment, the first network device may determine to reduce its transmit power by a different predefined transmit power reduction factor depending on the range in which the interference lies. For example, if the interference associated with the second network device falls within a first interference range, the first network device may select a first predefined transmit power reduction factor. If the interference associated with the second network device falls within a second interference range, the first network device may select a second predefined transmit power reduction factor, and so on. In another embodiment, the first network device may select the transmit power reduction factor so that the interference generated by the first network device at the second network device is below the power detection threshold of the second network device. In another embodiment, the first network device may reduce its transmit power so that the interference detected at the second network device is below an interference threshold implemented by the second network device. The flow continues at block 612.

At block 612, the first network device reduces its transmit power by the transmit power reduction factor. The first network device can transmit subsequent messages at the reduced transmit power. From block 612, the flow loops back to block 604 where the first network device continues to monitor the interference associated with the second network device.

Although FIG. 6 describes operations for using the priority to determine which network device should reduce its transmit power, embodiments are not so limited. In other embodiments, other suitable factors may be used to determine which network device should execute the asymmetric interference reduction technique and reduce its transmit power. For example, the network device with less stringent quality of service specifications may reduce its transmit power.

It should be understood that FIGS. 1-6 are examples meant to aid in understanding embodiments and should not be used to limit embodiments or limit scope of the claims. Embodiments may comprise additional circuit components, different circuit components, and/or may perform additional operations, fewer operations, operations in a different order, operations in parallel, and some operations differently. Although examples describe the first network device using a preamble detection technique to detect transmissions of the second network device for estimating interference using the symmetric interference reduction technique and the coordinated interference reduction technique, embodiments are not so limited. In other embodiments, the first network device may use of a first communication network may estimate the interference associated with the second network device of the second communication network based, at least in part, on an attenuation between the first network device and the second network device as described above in FIG. 6. For example, the first network device may cause other network devices in the first communication network to temporarily disable transmissions during a predefined time interval. Any transmissions detected at the first network device during the predefined time interval may be attributed to the second network device (and the second communication network). The first network device may estimate the attenuation from the second network device to the first network device based, at least in part, on the signal strength of the transmissions detected during the predefined time interval. Assuming attenuation symmetry and based on knowledge of the minimum power that can be detected by the second device, the first network device can determine the transmit power reduction factor so that the first network device does not generate interference at the second network. In other embodiments, the first network device and the second network device may use other suitable techniques to estimate the interference associated with the proximate communication network.

As described above in the asymmetric interference reduction technique, the first network device (e.g., the PLC device) may reduce its transmit power so that the second network device (e.g., the VDSL device) does not detect the transmissions of the first network device. However, the second network device does not reduce its transmit power. In some embodiments, after reducing the transmit power, the first network device may continue to determine whether a transmission from the second network device was detected. By continuing to monitor the communication channel for the presence of transmissions/interference from the second network device, the first network device can vary the transmit power to take changing channel conditions, error in interference estimation, background noise, and other such factors into consideration. If transmissions from the second network device are detected, the first network device can estimate the interference associated with the detected transmission. The first network device may attempt to further reduce its transmit power to minimize interference at the second network device. However, if transmissions from the second network device are not detected, the first network device may determine that there is no interference from the second network device, that the interference is below a detection threshold of the first network device, or that the second network device is no longer active. Assuming a reciprocal channel, the first network device may determine that transmissions of the first network device will not be detected at the second network device and will not affect the performance of the second network device. Consequently, the first network device may determine to increase its transmit power. In some embodiments, the first network device may increase its transmit power to the maximum allowable transmit power and may transmit subsequent messages using the maximum allowable transmit power. However, in other embodiments, the first network device may increase the transmit power by a predefined power increment and may transmit subsequent messages at the increased transmit power (that may not be the maximum allowable transmit power).

Although embodiments describe the network devices 102 and 112 exchanging coexistence messages to determine whether to share resources or reduce the transmit power, in other embodiments, the network devices 102 and 112 may exchange coexistence messages to both reduce the transmit power and share resources. For example, the network devices 102 and 112 may reduce their respective transmit power in response to determining that the interference exceeds an interference threshold. The network devices 102 and 112 may exchange coexistence messages to determine whether one or both of the devices should reduce their respective transmit power, by how much the network devices should reduce their respective transmit power, etc. If the interference detected by one or both of the network devices continues to exceed the interference threshold even after reducing the transmit power, the network devices 102 and 112 may exchange coexistence messages to determine how to share communication resources.

In some embodiments, operations for reducing the transmit power of the first network device in response to detecting the interference generated by a second network device may be executed periodically to take into consideration variations in communication channel conditions, relocation of the first network device and/or second network device, addition of new devices to the first communication network and/or the second communication network, etc.

In some embodiments, the first communication network and the second communication network may include multiple network devices. However, each network device may detect a different amount of interference from the proximate communication network. For example, a first PLC device of the PLC network may detect interference from the VDSL network. However, a second PLC device of the PLC network may not detect any interference from the VDSL network. In this example, the first PLC device may execute suitable operations described above to minimize the interference. However, the second PLC device may not execute the operations described above and instead, may continue to transmit at a maximum transmit power.

Although examples describe the first network device of the first communication network detecting interference from a second network device of the second communication network, embodiments are not so limited. In other embodiments, the first network device may detect interference from multiple network devices of the second communication network. In this embodiment, the first network device may estimate the transmit power reduction factor based on the strongest interference generated by the second communication network. For example, a PLC device may detect interference from a first VDSL device and a second VDSL device. If the PLC device detects a higher amount of interference from the second VDSL device, the PLC device may determine the transmit power reduction factor based on the interference generated by the second VDSL device.

As will be appreciated by one skilled in the art, aspects of this disclosure may be embodied as a system, method, or computer program product. Accordingly, aspects of this disclosure may take the form of an entirely hardware embodiment, a software embodiment (including firmware, resident software, micro-code, etc.) or an embodiment combining software and hardware aspects that may all generally be referred to herein as a "circuit," "module," "unit" or "system." Furthermore, aspects of this disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code embodied on a computer readable medium for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure are described with reference to flowchart illustrations and/or block diagrams of methods, apparatus (systems) and computer program products according to embodiments of this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
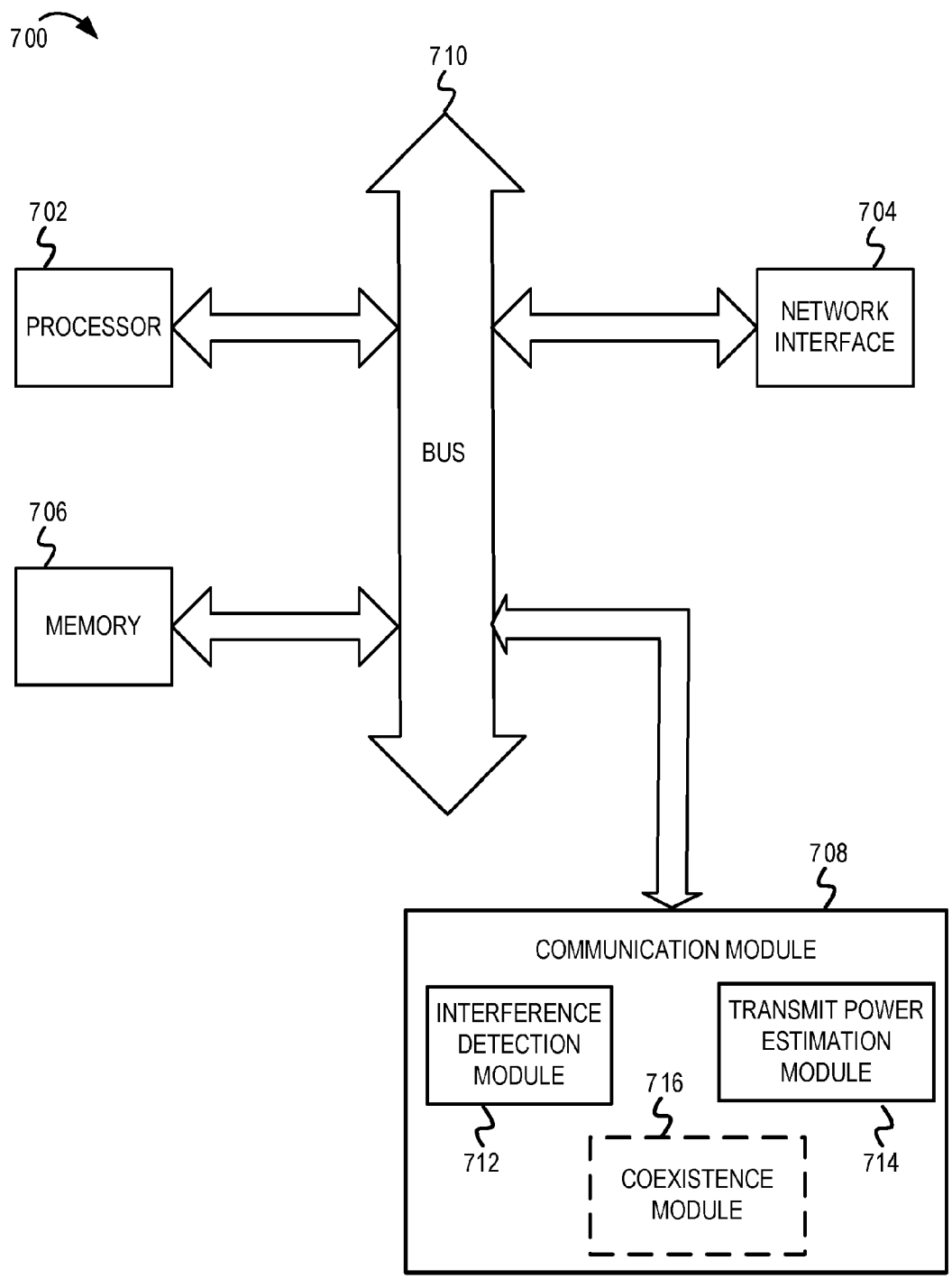
FIG. 7 is a block diagram of one embodiment of an electronic device including a mechanism for minimizing interference between communication networks.

FIG. 7 is a block diagram of one embodiment of an electronic device 700 including a mechanism for minimizing interference between communication networks. In some embodiments, the electronic device 700 may be a dedicated PLC device, a dedicated VDSL device, a desktop computer, a laptop computer, a tablet computer, a smart appliance, a television set-top box, a gaming console, or other electronic device that includes hardware, software, and/or firmware to implement PLC protocols or VDSL protocols for communication. The electronic device 700 includes a processor 702 (possibly including multiple processors, multiple cores, multiple nodes, and/or implementing multi-threading, etc.). The electronic device 700 includes a memory 706. The memory 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., a PLC interface, a DSL interface, an Ethernet interface, etc.).

The electronic device 700 also includes a communication module 708. The communication module 708 includes an interference detection module 712 and a transmit power estimation module 714. A coexistence module 716 in the communication module 708 is depicted using dashed lines to indicate that it is optional; i.e., the electronic device 700 may or may not include the coexistence module 716 (e.g., coexistence functionality) depending on the implementation. The communication module 708 may attempt to minimize interference between the electronic device 700 ("first electronic device") of a first communication network and a second electronic device of a proximate second communication network. In one embodiment, the communication module 708 of the first electronic device may exchange coexistence messages with the second electronic device to determine whether to reduce the transmit power or share communication resources, as described in FIGS. 1-4. In another embodiment, the communication module 708 may determine by how much to reduce the transmit power of the first electronic device based, at least in part, on the interference associated with the second electronic device, as described in FIGS. 1 and 5. In this embodiment, the first electronic device and the second electronic device may independently reduce their respective transmit power based, at least in part, on the interference associated with the other electronic device without coordination between the two electronic devices. In another embodiment, the communication module 708 may determine to reduce the transmit power of the first electronic device if the priority of the first electronic device is lower than priority of the second electronic device, as described in FIGS. 1 and 6. However, the communication module 708 may not reduce the transmit power of the first electronic device if the priority of the first electronic device exceeds the priority of the second electronic device. Instead, the first electronic device may rely on the second network device to reduce the transmit power of the second network device.

Any one of these functionalities may be partially (or entirely) implemented in hardware and/or on the processor 702. For example, the functionality may be implemented with a system-on-a-chip (SoC), an application specific integrated circuit (ASIC), in logic implemented in the processor 702, in a co-processor on a peripheral device or card, etc. Further, realizations may include fewer or additional components not illustrated in FIG. 7 (e.g., video cards, audio cards, additional network interfaces, peripheral devices, etc.). For example, in addition to the processor 702 coupled with the bus 710, the communication module 708 may comprise at least one additional processor module. As another example, the communication module 708 may include one or more radio transceivers, processors, memory, and other logic to implement the communication protocols and related functionality. The processor 702, the memory 706, and the network interfaces 704 are coupled to the bus 710. Although illustrated as being coupled to the bus 710, the memory 706 may be coupled to the processor 702. For example, in addition to the processor 702 coupled with the bus 710, the electronic device 700 may comprise at least one additional processor module.

While the embodiments are described with reference to various implementations and exploitations, it will be understood that these embodiments are illustrative and that the scope of this disclosure is not limited to them. In general, techniques for minimizing interference between communication networks as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of this disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of this disclosure.

What is claimed is:

1. A method for minimizing communication interference comprising:
    determining, by a first network device of a first communication network, an interference level associated with a second network device of a second communication network;
    determining, in response to determining that the interference level does not exceed an interference threshold, to reduce at least one member selected from the group consisting of:
        a first transmit power of the first network device, and a second transmit power of the second network device; and
    determining to share a communication resource between the first network device and the second network device in response to determining that the interference level exceeds the interference threshold.

2. The method of claim 1, further comprising:
    determining to transmit a coexistence message from the first network device to the second network device, wherein determining to share the communication resource is based, at least in part, on the coexistence message.

3. The method of claim 2, wherein the coexistence message is transmitted via a third network.

4. The method of claim 2, wherein determining to share the communication resource comprises at least one member selected from the group consisting of:
    sharing the communication resource in a time domain; and
    sharing the communication resource in a frequency domain.

5. The method of claim 1, further comprising:
    determining a first transmit power reduction factor in response to determining to reduce the first transmit power, the second transmit power, or a combination thereof;
    determining to transmit a coexistence message comprising the transmit reduction factor from the first network device to the second network device to reduce the second transmit power by the first transmit power reduction factor.

6. The method of claim 5, wherein the first transmit power reduction factor is determined based, at least in part on a priority of the first network device.

7. The method of claim 5, further comprising:
    determining a performance degradation in the second communication network based, at least in part, on determining to reduce the second transmit power by the first transmit power reduction factor; and
    determining to share the communication resource between the first network device and the second network device in response to determining the performance degradation.

8. The method of claim 5, further comprising:
    determining a second transmit power reduction factor; and
    determining to reduce the first transmit power by the second transmit power reduction factor.

9. The method of claim 8, further comprising:
    determining a performance degradation in the first communication network based, at least in part, on determining to reduce the first transmit power by the second transmit power reduction factor; and
    determining to share the communication resource between the first network device and the second network device in response to determining the performance degradation.

10. The method of claim 8, wherein the first transmit power reduction factor and the second transmit power reduction factor are determined based, at least in part, on the interference level.

11. The method of claim 1, wherein determining the interference level comprises:
    determining a signal strength of a preamble of a transmission received from the second network device; and
    determining the interference level based, at least in part, on a difference between the signal strength and a power detection threshold associated with the first network device, wherein the power detection threshold is a minimum signal strength that can be received by the first network device.

12. The method of claim 1, wherein determining the interference level comprises:

providing a coexistence message to the second network device via a third communication network to select a time interval for determining the interference level;

detecting a transmission of the second network device during the time interval; and determining the interference level based, at least in part, on the transmission.

13. The method of claim 12, further comprising:

notifying other network devices of the first communication network to defer transmissions during the time interval.

14. The method of claim 1, wherein, the first network device and the first communication network implement one or more powerline communication (PLC) protocols; and the second network device and the second communication network implement one or more digital subscriber line (DSL) protocols.

15. A first network device of a first communication network, the first network device comprising:

a processor; and a memory to store instructions, the instructions when executed by the processor, cause the first network device to:

determine an interference level associated with a second network device of a second communication network;

determine, in response to determining that the interference level does not exceed an interference threshold, to reduce at least one member selected from the group consisting of:

a first transmit power of the first network device, and a second transmit power of the second network device; and determine to share a communication resource between the first network device and the second network device in response to determining that the interference level exceeds the interference threshold.

16. The first network device of claim 15, wherein the instructions further cause the first network device to:

determine to transmit a coexistence message from the first network device to the second network device, wherein determining to share the communication resource is based, at least in part, on the coexistence message.

17. The first network device of claim 16, wherein the instructions that cause the first network device to determine to share the communication resource comprise at least one member selected from the group consisting of:

instructions that cause the first network device to share the communication resource in a time domain; and instructions that cause the first network device to share the communication resource in a frequency domain.

18. The first network device of claim 15, wherein the instructions further cause the first network device to:

determine a first transmit power reduction factor in response to determining to reduce the first transmit power, the second transmit power, or a combination thereof;

determine to transmit a coexistence message comprising the transmit reduction factor from the first network device to the second network device to reduce the second transmit power by the first transmit power reduction factor.

19. The first network device of claim 18, wherein the instructions further cause the first network device to:

determining a second transmit power reduction factor; and determining to reduce the first transmit power by the second transmit power reduction factor.

20. The first network device of claim 19, wherein the first transmit power reduction factor and the second transmit power reduction are determined based, at least in part, on the interference level.

21. A non-transitory machine-readable storage medium having machine executable instructions stored therein, the machine executable instructions comprising instructions to:

determine an interference level associated with a second network device of a second communication network;

determine, in response to determining that the interference level does not exceed an interference threshold, to reduce at least one member selected from the group consisting of:

a first transmit power of a first network device, and a second transmit power of the second network device; and determine to share a communication resource between the first network device and the second network device in response to determining that the interference level exceeds the interference threshold.

22. The non-transitory machine-readable storage medium of claim 21, further comprising instructions to:

determine to transmit a coexistence message from the first network device to the second network device, wherein determining to share the communication resource is based, at least in part, on the coexistence message.

23. The non-transitory machine-readable storage medium of claim 22, wherein the instructions that cause the first network device to determine to share the communication resource comprise at least one member selected from the group consisting of:

instructions that cause the first network device to share the communication resource in a time domain; and instructions that cause the first network device to share the communication resource in a frequency domain.

24. The non-transitory machine-readable storage medium of claim 21, further comprising instructions to:

determine a first transmit power reduction factor in response to determining to reduce the first transmit power, the second transmit power, or a combination thereof;

determine to transmit a coexistence message comprising the transmit reduction factor from the first network device to the second network device to reduce the second transmit power by the first transmit power reduction factor.

25. The non-transitory machine-readable storage medium of claim 24, further comprising instructions to:

determining a second transmit power reduction factor; and determining to reduce the first transmit power by the second transmit power reduction factor.

26. The non-transitory machine-readable storage medium of claim 25, wherein the first transmit power reduction factor and the second transmit power reduction factor are determined based, at least in part, on the interference level.

* * * * *